United States Patent
Larsson et al.

(10) Patent No.: US 10,334,627 B2
(45) Date of Patent: Jun. 25, 2019

(54) METHOD AND APPARATUS FOR ENHANCED UPLINK REFERENCE SIGNAL IN LISTEN-BEFORE-TALK SYSTEMS

(71) Applicant: Telefonaktiebolaget LM Ericsson (publ), Stockholm (SE)

(72) Inventors: Daniel Larsson, Stockholm (SE); Jung-Fu Cheng, Fremont, CA (US); Sorour Falahati, Stockholm (SE); Havish Koorapaty, Saratoga, CA (US); Amitav Mukherjee, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 15/511,290

(22) PCT Filed: Sep. 25, 2015

(86) PCT No.: PCT/SE2015/051006
§ 371 (c)(1),
(2) Date: Mar. 15, 2017

(87) PCT Pub. No.: WO2016/048227
PCT Pub. Date: Mar. 31, 2016

(65) Prior Publication Data
US 2017/0251497 A1    Aug. 31, 2017

Related U.S. Application Data

(60) Provisional application No. 62/055,230, filed on Sep. 25, 2014.

(51) Int. Cl.
*H04W 74/08* (2009.01)
*H04L 5/00* (2006.01)
*H04W 16/14* (2009.01)

(52) U.S. Cl.
CPC ....... *H04W 74/0816* (2013.01); *H04L 5/0048* (2013.01); *H04L 5/0053* (2013.01); *H04W 16/14* (2013.01)

(58) Field of Classification Search
CPC ............. H04W 16/14; H04W 72/0446; H04W 74/0808; H04W 74/0816; H04L 5/0048; H04L 5/0053
See application file for complete search history.

(56) References Cited

U.S. PATENT DOCUMENTS

| | | |
|---|---|---|
| 2003/0091019 A1 | 5/2003 | Takano |
| 2015/0085797 A1* | 3/2015 | Ji .............................. H04J 3/16 370/329 |

(Continued)

FOREIGN PATENT DOCUMENTS

| | | |
|---|---|---|
| RU | 2259639 C2 | 8/2005 |
| RU | 2403678 C2 | 11/2010 |
| WO | 2013112983 A2 | 8/2013 |

OTHER PUBLICATIONS

Unknown, Author, "CSMA/CA based resource selection", 3GPP TSG-RAN WG2 #84, R2-133840, San Francisco, CA, Samsung, Nov. 11-15, 2013, 1-4.

*Primary Examiner* — Will W Lin
(74) *Attorney, Agent, or Firm* — Sage Patent Group

(57) ABSTRACT

In one aspect, the teachings herein describe an enhanced Reference Signal, RS, that is designed to be available for transmission in any symbol of a subframe. The enhanced RS may be an enhanced Sounding Reference Signal, SRS, or an enhanced DeModulation Reference Signal, DMRS. The enhanced RS provides an advantageous mechanism for channel capture in Listen-Before-Talk, LBT, scenarios, because subsequent to performing a successful Clear Channel Assessment, CCA, a node can begin transmitting the enhanced RS, to thereby capture the channel. The node can (Continued)

then transition into an actual data transmission on the channel according to whatever timing constraints are associated with the data transmission. In at least one embodiment, the enhanced RS is used for capturing an uplink channel on an LTE carrier operated in unlicensed spectrum, as part of a License Assisted Access, LAA, configuration.

27 Claims, 9 Drawing Sheets

(56) References Cited

U.S. PATENT DOCUMENTS

| | | | | |
|---|---|---|---|---|
| 2015/0223241 | A1* | 8/2015 | Cattoni | H04L 5/0044 370/329 |
| 2015/0304995 | A1* | 10/2015 | Yi | H04L 5/001 370/329 |
| 2015/0327233 | A1* | 11/2015 | Liu | H04W 56/0015 370/329 |
| 2015/0365880 | A1* | 12/2015 | Malladi | H04L 5/0007 370/312 |
| 2015/0365931 | A1* | 12/2015 | Ng | H04L 1/1812 370/329 |
| 2016/0043843 | A1* | 2/2016 | Liu | H04L 5/0048 370/329 |
| 2016/0050667 | A1* | 2/2016 | Papasakellariou | H04W 74/0808 370/329 |
| 2017/0041912 | A1* | 2/2017 | Tanaka | H04W 16/14 |
| 2017/0208588 | A1* | 7/2017 | Park | H04L 27/26 |
| 2017/0208627 | A1* | 7/2017 | You | H04W 72/0446 |
| 2017/0215202 | A1* | 7/2017 | Yang | H04L 5/0048 |
| 2017/0238190 | A1* | 8/2017 | Yang | H04L 5/00 370/329 |
| 2017/0238260 | A1* | 8/2017 | Kim | H04W 52/04 455/522 |

* cited by examiner

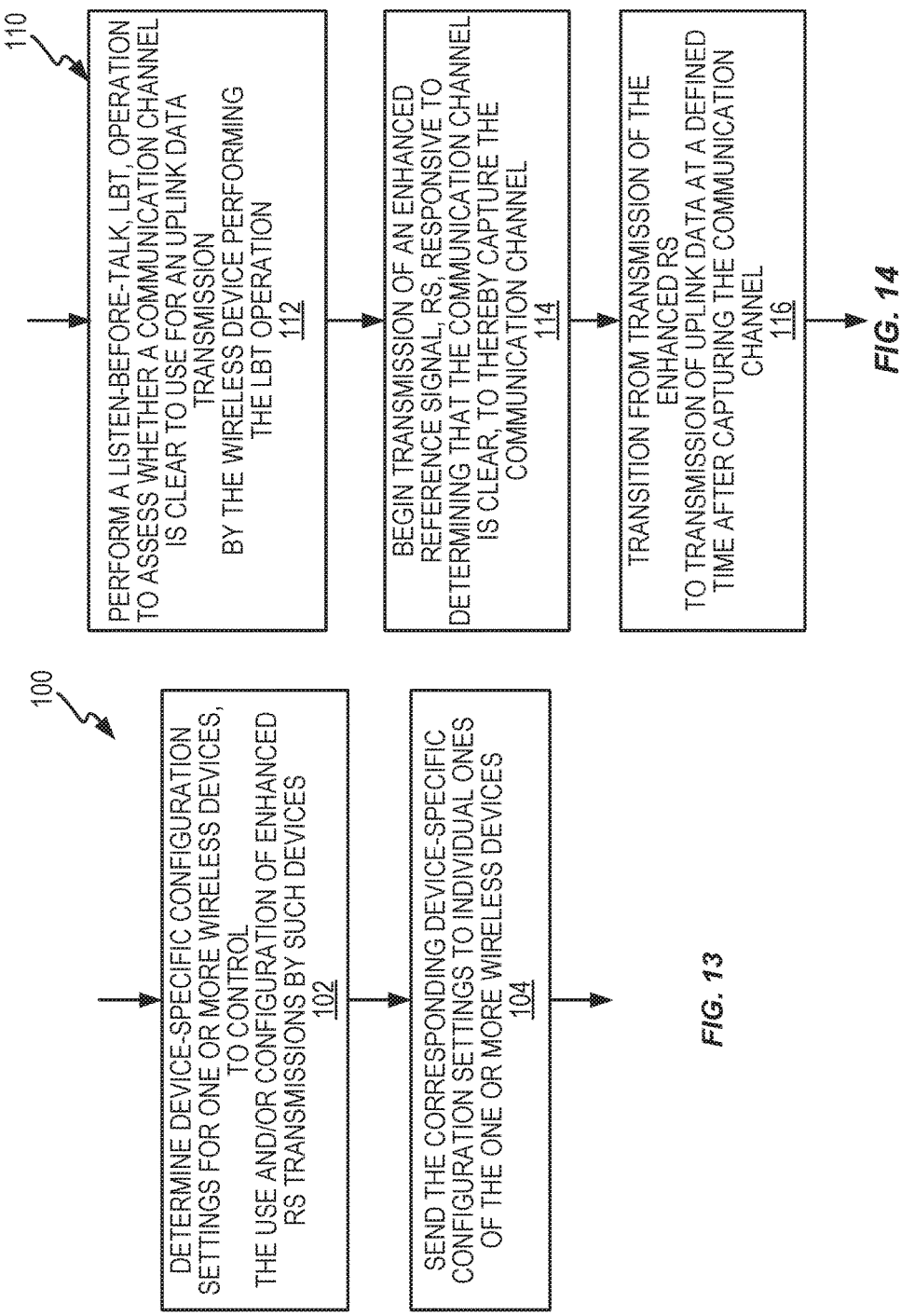

METHOD AND APPARATUS FOR ENHANCED UPLINK REFERENCE SIGNAL IN LISTEN-BEFORE-TALK SYSTEMS

TECHNICAL FIELD

The teachings herein relate to uplink reference signal transmission, and particularly relate to enhanced uplink reference signals in Listen-Before-Talk, LBT, systems, such as in Licensed-Assisted Access or LAA systems.

BACKGROUND

The new 3GPP Rel-13 study item "Licensed Assisted Access" or LAA allows Long Term Evolution, LTE, equipment to use unlicensed 5 GHz spectrum as a complement to the licensed spectrum. With LAA, devices connect to a primary cell or PCell in the licensed spectrum and a secondary cell or SCell in the unlicensed spectrum. By aggregation of the licensed and unlicensed carriers, the User Equipment, UE, benefits from the additional transmission capacity provided by the unlicensed spectrum. To reduce the changes required for aggregating licensed and unlicensed spectrum, the LTE frame timing in the PCell is simultaneously used in the SCell.

Regulatory requirements, however, may not permit transmissions in the unlicensed spectrum without first performing some type of channel sensing. That is, because the unlicensed spectrum must be shared with other radios of similar or dissimilar wireless technologies, a so-called Listen-Before-Talk, LBT, operation needs to be applied by the LTE node(s) before transmitting on a channel that uses unlicensed spectrum. Today, the unlicensed 5 GHz spectrum is mainly used by equipment implementing the IEEE 802.11 Wireless Local Area Network, WLAN, standard known commercially as WI-FI.

IEEE 802.11 equipment uses a contention based medium access scheme. This scheme does not allow the wireless medium to be reserved at specific instances of time. Instead, IEEE 802.11 compliant devices only support the immediate reservation of the wireless medium following the transmission of at least one medium reservation message, e.g., a Request to Send, RTS, message or a Clear to Send, CTS, message. It is recognized herein that an analogous medium reservation signal is needed for LAA-LTE transmissions on both the downlink and the uplink, before the commencement of data transmission.

LTE uses Orthogonal Frequency Division Multiplexing or OFDM in the downlink and Discrete Fourier Transform, DFT, spread OFDM in the uplink, which is also referred to as Single-Carrier Frequency Division Multiple Access or SC-FDMA. The basic LTE downlink physical resource can be seen as a time-frequency grid, as illustrated in FIG. 1. The grid comprises Resource Elements or REs, where each RE corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE uplink transmissions are organized into radio frames of 10 ms, each radio frame consisting of ten equally-sized subframes of length Tsubframe=1 ms. FIG. 2 illustrates this arrangement. For normal cyclic prefix or CP, one subframe consists of 14 SC-FDMA symbols. The duration of each symbol is approximately 71.4 µs.

Furthermore, the resource allocation in LTE is typically described in terms of Physical Resource Blocks, referred to as PRBs or simply RBs. One RB corresponds to one slot of 0.5 ms in the time domain and twelve contiguous subcarriers in the frequency domain. A pair of two adjacent RB in the time direction equals 1.0 ms and is known as a RB pair. RBs are numbered in the frequency domain, starting with 0 from one end of the system bandwidth.

Uplink transmissions are dynamically scheduled, i.e., in each downlink subframe the base station transmits control information about which terminals should transmit data to the eNB in subsequent subframes, and which RBs to use for the data transmissions. Here, "eNB" denotes a LTE base station in the LTE Radio Access Network, RAN.

The uplink resource grid includes data and uplink control information for Physical Uplink Share Channel or PUSCH, transmissions, and includes uplink control information for Physical Uplink Control Channel or PUCCH transmissions, along with various reference signals. The reference signals include DeModulation Reference Signals or DMRS, and Sounding Reference signals or SRS. DMRS are used for coherent demodulation of PUSCH and PUCCH data, whereas SRS is not associated with any user traffic or control information but is generally used to estimate the uplink channel quality for purposes of frequency-selective scheduling.

An example uplink subframe is shown in FIG. 3. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

The subframes in which SRSs are transmitted by any UE within a cell are indicated by cell-specific broadcast signaling. A four-bit cell-specific "srsSubframeConfiguration" parameter indicates fifteen possible sets of subframes in which SRS may be transmitted within each radio frame. But, as noted, SRS transmissions are always in the last SC-FDMA symbol in the configured UL subframes, and PUSCH transmission may not be permitted on these symbols.

In the frequency domain, the SRS sequence for a particular UE is mapped to alternating subcarriers in a comb-like manner. This allows multiple UEs to simultaneously transmit SRS without overlap. The SRS sequence spans at least four RBs, and the maximum allowed bandwidth of one SRS is dependent on the UL system bandwidth and the cell-specific parameter srs-BandwidthConfig, $C_{SRS} \in \{0, 1, \ldots, 7\}$. For example, for an UL system bandwidth of 110 RBs and $C_{SRS}=0$, the maximum possible SRS bandwidth for a particular UE is 96 RBs.

Further, different phase or cyclic shifts can be applied to SRS sequences on the same REs to make them mutually orthogonal. Up to eight such UE-specific shifts currently available per comb, according to the relevant LTE specifications. Thus, up to sixteen distinguishable full-BW SRS sequences can be assigned to UEs currently.

The LTE Release 10, Rel-10, standard supports bandwidths larger than 20 MHz. One important requirement on LTE Rel-10 is to assure backward compatibility with LTE Rel-8. This requirement extends to spectrum compatibility. The need for spectrum compatibility means that an LTE Rel-10 carrier wider than 20 MHz should appear to a Rel-8 terminal as a number of LTE carriers. Each such carrier can be referred to as a Component Carrier or CC. For early LTE Rel-10 deployments it is expected that there will be a smaller number of LTE Rel-10-capable terminals compared to many LTE legacy terminals that predate the Rel-10 feature set. Therefore, it is necessary to assure that legacy terminals can efficiently use wide carriers. That is, a wideband carrier exceeding the Rel-8 carrier bandwidth should be structured so as to allow legacy terminals to be scheduled in all parts of the wideband carrier.

Carrier Aggregation or CA provides a straightforward mechanism to accomplish the desired compatibility. With CA, the aggregate or overall carrier bandwidth can exceed the capability of legacy terminals, but legacy terminals may be compatible with the individual CCs aggregated together to form the wideband carrier.

Correspondingly, this sort of CA configuration implies that a LTE Rel-10 terminal can receive multiple CCs, where each of CCs can have the same structure as a Rel-8 carrier. CA is illustrated in FIG. 4, which shows the aggregation of five 20 MHz CCs. A CA-capable UE is assigned a PCell, which is always activated, and may be further assigned one or more SCells. SCells may be activated or deactivated dynamically.

The number of aggregated CCs as well as the bandwidth of each CC may be different for the uplink and downlink. A symmetric configuration refers to the case where the number of CCs in the downlink and uplink are the same. Conversely, an asymmetric configuration refers to the case where the number of CCs in the downlink differs from the number of CCs in the uplink. Notably, the number of CCs configured in a given cell may be different from the number of CCs seen by a UE or other terminal. A terminal may, for example, support more downlink CCs than uplink CCs, even though the cell is configured with the same number of uplink and downlink CCs.

In typical WLAN deployments, Carrier Sense Multiple Access with Collision Avoidance, CSMA/CA, is used for medium access. A WLAN device uses CSMA/CA to sense whether the targeted channel is clear—i.e., to perform a Clear Channel Assessment or CCA. The WLAN device initiates a transmission on the WLAN channel only if only if the channel is deemed to be idle based on the CCA performed by the device. In case the channel is declared as busy, the transmission is essentially deferred until the channel is deemed to be idle. When the ranges of several WLAN Access Points, APs, using the same frequency overlap, all transmissions related to one AP might be deferred in case a transmission on the same frequency to or from another AP that is within range can be detected. Effectively, this circumstance means that if several APs are within range of each other, they will have to share a given channel in time, and the throughput for the individual APs may be severely degraded. FIG. 5 offers a generalized illustration of the LBT mechanism.

Several issues arise when a LTE network uses WLAN spectrum for LAA operation, because of the need for the LTE network to coexist with one or more other networks, systems or devices that also use all or part of the same unlicensed spectrum. Among other things, it is recognized herein that operating a LTE carrier in unlicensed spectrum according to the same conventions used for licensed-spectrum operation can seriously degrade the performance of any WI-FI system operating in the same unlicensed spectrum, as WI-FI access points and devices will not transmit on a channel once the channel is detected as being occupied.

One way for LTE to utilize unlicensed spectrum reliably is to transmit essential control signals and channels on a licensed carrier. FIG. 6 illustrates an approach to CA, where a UE is connected to a PCell in a licensed band and one or more SCells in an unlicensed band. The SCell operating in the unlicensed spectrum may be referred to as a "License Assisted Secondary Cell" or LA SCell.

For proper LAA operation, it is recognized herein that a node preparing to transmit on a channel having a channel frequency within the unlicensed spectrum, should first sense whether the channel is clear for transmission and should then immediately capture the channel so that other nodes or entities will not see the involved frequency or frequencies as being clear for use. However, it is recognized herein that current LTE specifications do not provide a mechanism for immediate channel capture. Indeed, the existing specifications constrain the ability of a LTE base station or terminal to perform immediate channel capture after a successful CCA on a channel occupying unlicensed spectrum.

In particular, existing LTE standards dictate when certain signals can be sent within the context of the overall frame, subframe, and slot timing of the radio signal, and do not define signaling that may be started at essentially arbitrary times. For example, in LTE, DMRS may be transmitted only in conjunction with scheduled PUSCH or PUCCH transmissions. SRS transmissions are also specified as being permitted only at certain times.

SUMMARY

In one aspect, the teachings herein describe an enhanced Reference Signal, RS, that is designed to be available for transmission in any symbol of a subframe. The enhanced RS may be an enhanced Sounding Reference Signal, SRS, or an enhanced DeModulation Reference Signal, DMRS. The enhanced RS provides an advantageous mechanism for channel capture in Listen-Before-Talk, LBT, scenarios, because subsequent to performing a successful Clear Channel Assessment, CCA, a node can begin transmitting the enhanced RS, to thereby capture the channel. The node can then transition into an actual data transmission on the channel according to whatever timing constraints are associated with the data transmission. In at least one embodiment, the enhanced RS is used for capturing an uplink channel on an LTE carrier operated in unlicensed spectrum, as part of a License Assisted Access, LAA, configuration.

In one embodiment, a wireless device is configured for operation in a wireless communication network and includes a communication interface and a processing circuit. The communication interface is configured for transmitting signals to the wireless communication network and receiving signals from the wireless communication network. The processing circuit is operatively associated with the communication interface and configured to perform a listen-before-talk, LBT, operation to assess whether a communication channel is clear to use for an uplink data transmission by the wireless device. The processing circuit is further configured to begin transmitting an enhanced RS responsive to determining that the communication channel is clear, to thereby capture the communication channel, and further to transition from transmission of the enhanced RS to transmission of uplink data at a defined time after capturing the communication channel.

In a related embodiment, a method of operation by a wireless device configured for operation in a wireless communication network includes performing a LBT operation to assess whether a communication channel is clear to use for an uplink data transmission by the wireless device. The method further includes beginning transmission of an enhanced RS responsive to determining that the communication channel is clear, to thereby capture the communication channel. Still further, the method includes transitioning from transmission of the enhanced RS to transmission of uplink data at a defined time after capturing the communication channel.

In another embodiment, a network node is configured for operation in a wireless communication network and includes a communication interface configured for sending signaling to one or more wireless devices operating in the wireless communication network and receiving signaling from such devices. Further, the network node includes a processing circuit that is operatively associated with the communication interface and configured to determine device-specific configuration settings for one or more of the wireless devices. For each such device, the device-specific configuration settings control at least one of the following: whether the wireless device uses an enhanced RS for capturing communication channels as part of LBT operations performed by the wireless device; and one or more configuration settings controlling corresponding transmission parameters of any enhanced RS transmissions by the wireless device. The processing circuit is configured to send the corresponding device-specific configuration settings to individual ones of the one or more wireless devices.

In a related embodiment, a method of operation by a network node that is configured for operation in a wireless communication network includes determining device-specific configuration settings for one or more of the wireless devices. For each such device, the device-specific configuration settings control at least one of the following: whether the wireless device uses an enhanced RS for capturing communication channels as part of LBT operations performed by the wireless device; and one or more configuration settings controlling corresponding transmission parameters of any enhanced RS transmissions by the wireless device. The method further includes sending the corresponding device-specific configuration settings to individual ones of the one or more wireless devices.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 13 is a logic flow diagram of one embodiment of a method of processing a network node.

FIG. 14 is a logic flow diagram of one embodiment of a method of processing at a wireless device.

DETAILED DESCRIPTION

Several below embodiments provide example details for an "enhanced SRS" that contrasts with the "legacy SRS" as currently specified. In particular, the controlling specifications restrict the transmission of legacy SRS to the last symbol of a configured set of subframes that is signaled using four bits in cell-specific System Information Block 2, SIB2. In contrast, the enhanced SRS contemplated herein are "enhanced" at least in that they can be transmitted at essentially arbitrary times within the subframe/frame timing of the applicable radio signal structure. Correspondingly, the enhanced SRS are used for quickly capturing a channel after a successful CCA—i.e., the enhanced SRS are transmitted after a LBT operation confirms that the channel is clear for use. The enhanced SRS may be used solely for the channel capture portion of an UL transmission, with legacy SRS being used in the remaining portion of the UL transmission, or enhanced SRS may be used throughout the UL transmission.

As a first aspect of the contemplated SRS enhancements, it is proposed herein to allow the transmission of SRS in any UL symbol in the time domain. The ability to transmit enhanced SRS can be configured by higher network layers using a new device-specific parameter that indicates to a UE or other wireless device whether it is allowed to transmit enhanced SRS in any symbol. The baseline for the enhanced SRS is to be a single, aperiodic transmission performed only prior to an UL data transmission. Additionally, this new UE-specific parameter may also indicate whether the UE should always use the enhanced SRS parameters or should use the legacy SRS configuration for the remainder of the UL transmission.

Figure 1:
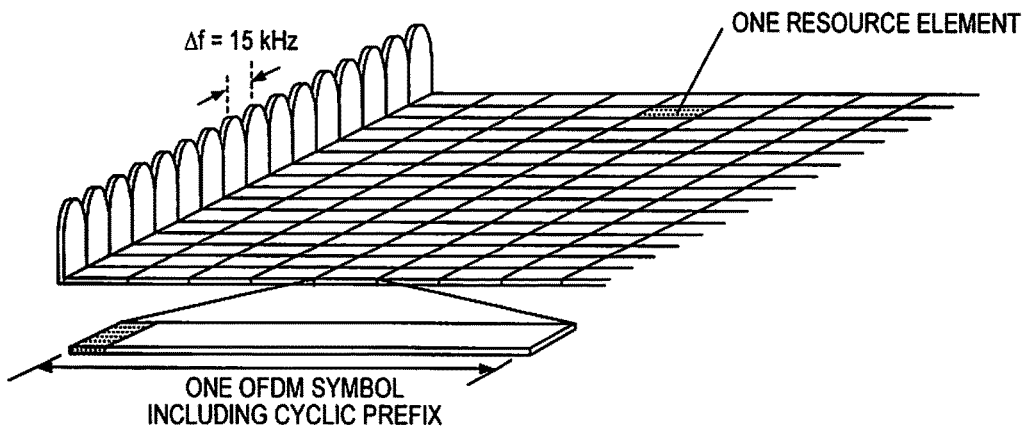
FIG. 1 is a diagram of downlink physical resources for the Orthogonal Frequency Division Multiplexing, OFDM, signal used in the downlink of a radio access network based on the Long Term Evolution, LTE, specifications.
Figure 2:
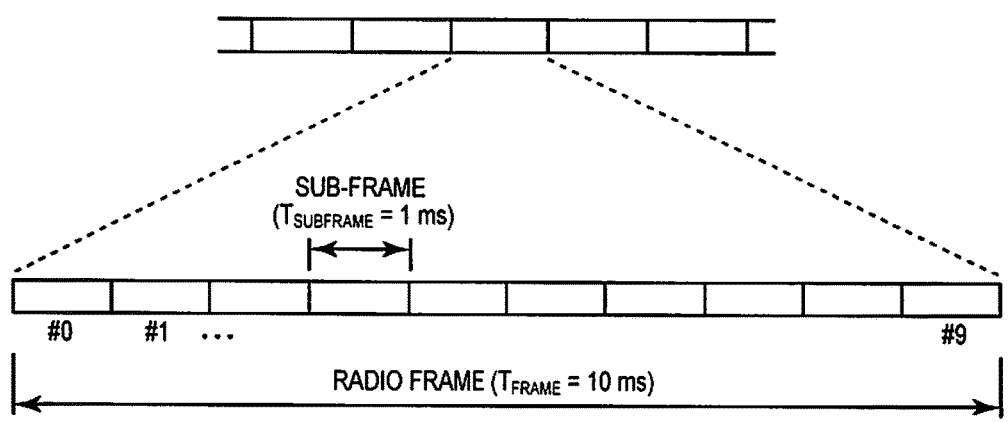
FIG. 2 is a diagram of the LTE time-domain structure.
Figure 3:
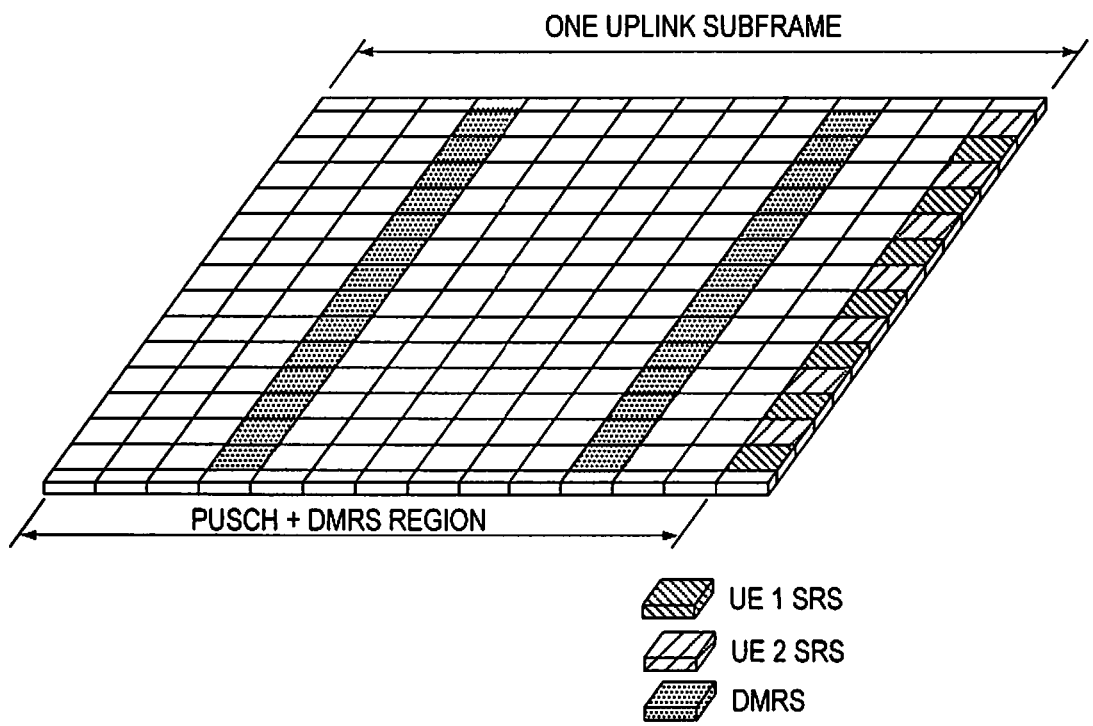
FIG. 3 is diagram of resource utilization or positioning for DeModulation Reference Signals, DMRS, and Sounding Reference Signals, SRS, in a normal uplink subframe of a LTE network.
Figure 4:
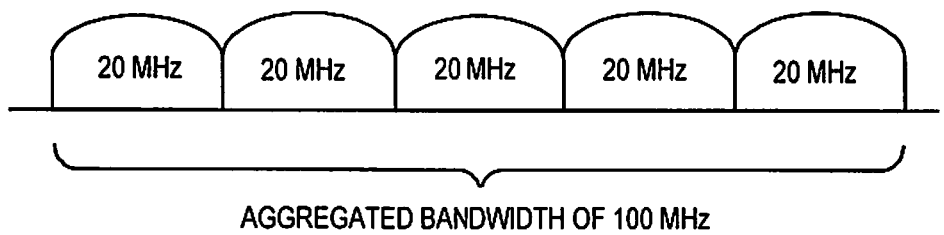
FIG. 4 is a diagram of Carrier Aggregation or CA, such as was introduced in Release 10 of the Third Generation Partnership Project, 3GPP, specifications.
Figure 5:
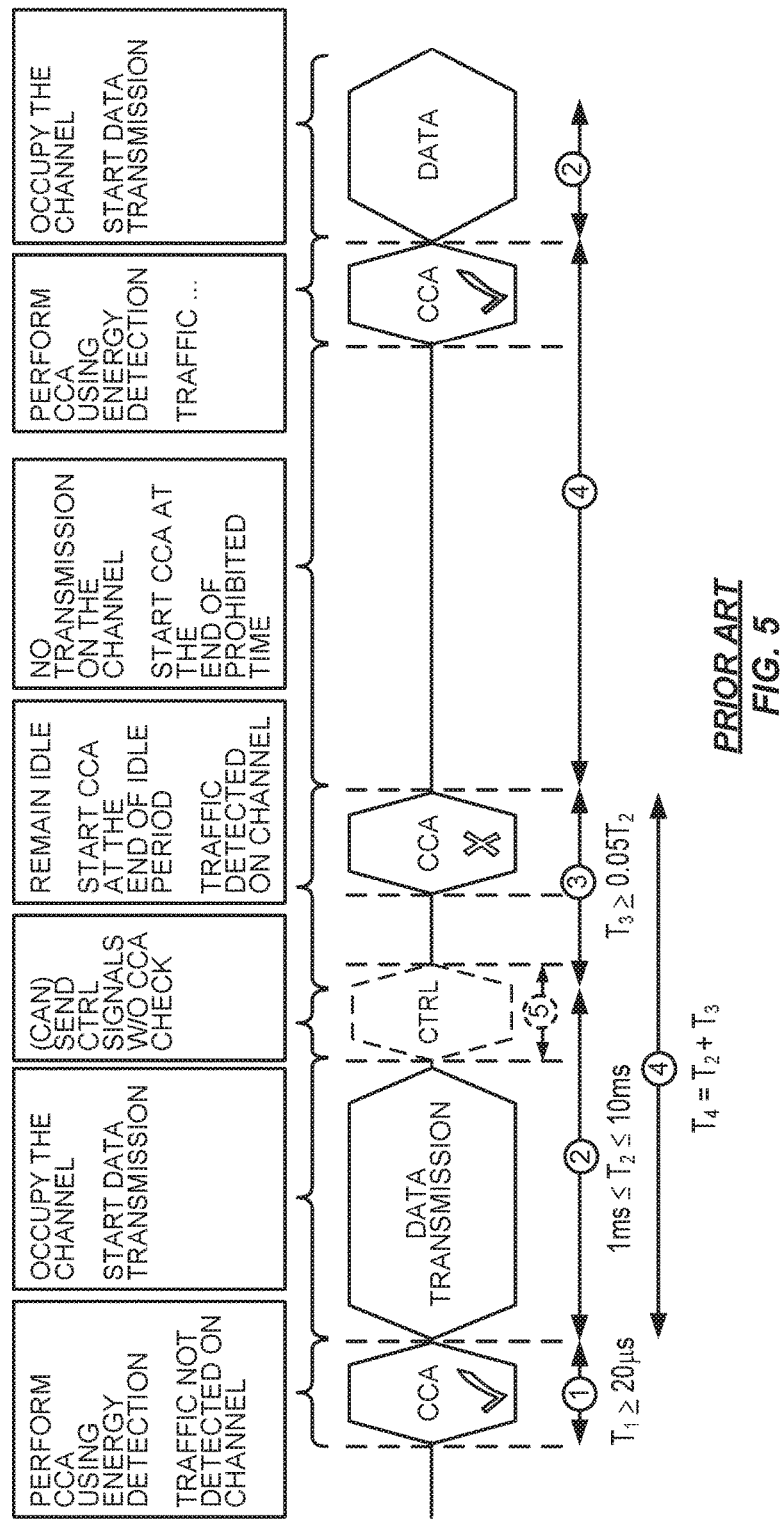
FIG. 5 is a diagram of an example Listen-Before-Talk, LBT, mechanism, such as is used to prevent the initiation of transmissions on a given communication channel until a Clear Channel Assessment, CCA, indicates that the channel is not in use.
Figure 6:
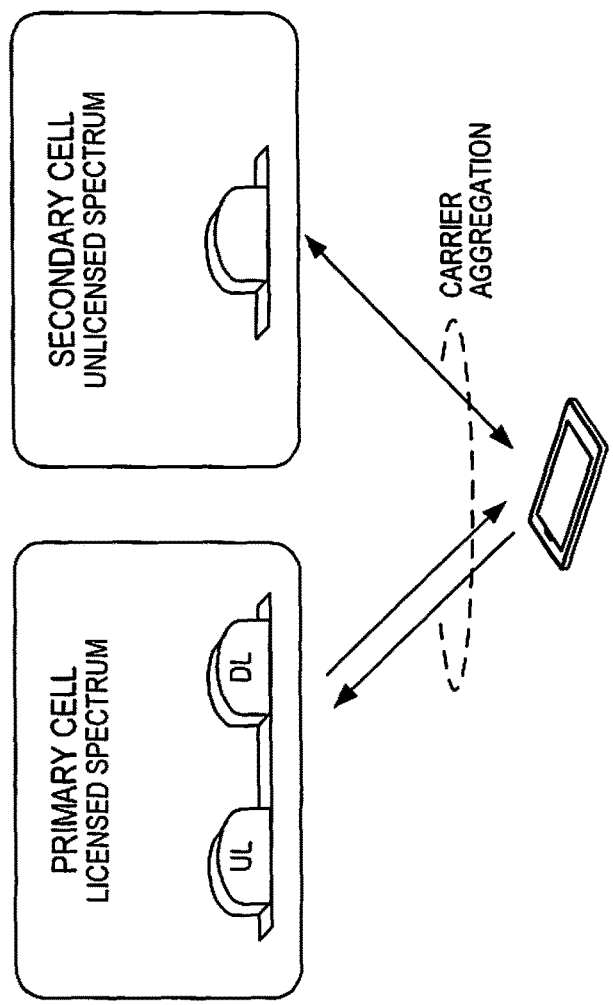
FIG. 6 is a diagram of a known arrangement for using Carrier Aggregation, CA, in a License Assisted Access, LAA, scenario.
Figure 7:
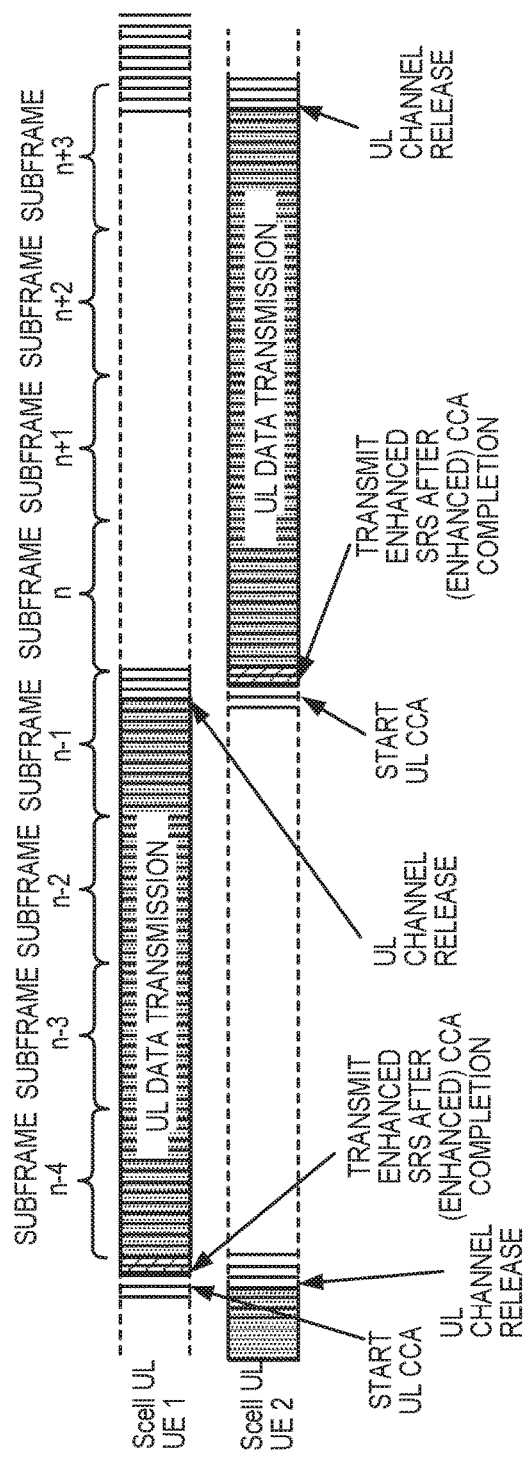
FIG. 7 is a diagram of one embodiment of an enhanced SRS transmission as contemplated herein.

The placement of the enhanced SRS within an UL subframe depends upon whether the UE performs LBT in a subset of SC-FDMA symbols prior to a subframe boundary or after the start of a subframe, and further on whether the starting symbol of the PUSCH is fixed or variable. An example of the enhanced SRS being transmitted in multiple symbols at the end of a subframe after successful LBT by two different UEs, UE1 and UE2, is shown in FIG. 7. Here, it is assumed that LBT is performed prior to the next subframe boundary and, if successful, enhanced SRS is transmitted up to the subframe boundary. Because UE1 and UE2 are not scheduled on the same subframes in this example, they do not transmit the enhanced SRS simultaneously.

Figure 8:
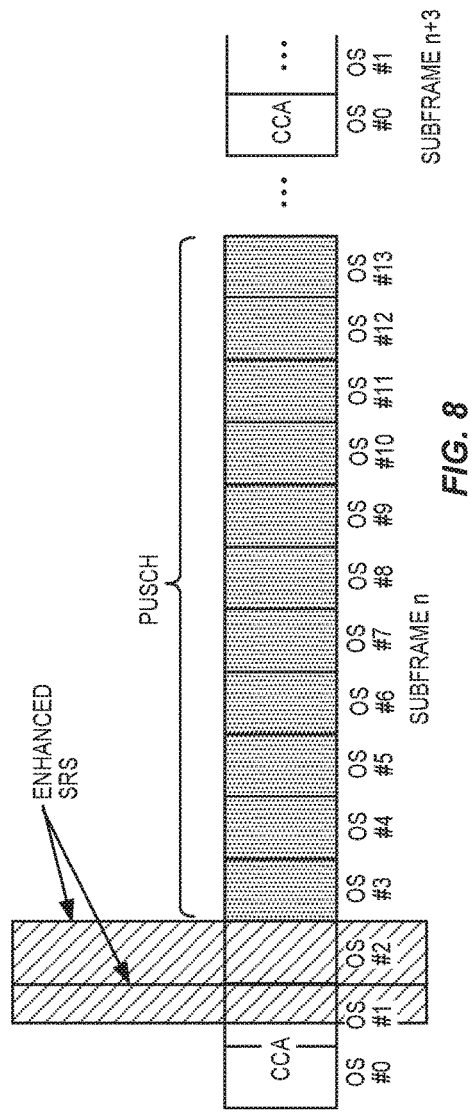
FIG. 8 is a diagram of another embodiment of enhanced SRS transmission as contemplated herein.

In FIG. 8, an example of enhanced SRS transmission by a UE at the beginning of a subframe n is shown, where it is assumed that the UE performs LBT by puncturing the first three OFDM symbols of the subframe n, and that the UL transmission always begins from the fourth symbol. In this example the CCA performed deems the channel to be idle before the end of the second symbol, so the UE immediately starts transmitting enhanced SRS from that point up to the end of the third symbol. The enhanced SRS spans the UL system bandwidth in this example.

Another notable aspect of the enhanced SRS is its frequency allocation. Different sets of UE-specific SRS parameters per UE are already supported in LTE for periodic and aperiodic SRS. This disclosure proposes that a new UE-specific parameter be used to indicate to a UE if it should reuse the legacy periodic or aperiodic SRS bandwidth, frequency comb pattern, frequency start position, and cyclic shift, or if a third set of enhanced SRS parameters should be used. Thus, a UE can be configured with up to three sets of SRS frequency-domain parameters corresponding to legacy periodic SRS, legacy aperiodic SRS, and enhanced SRS, respectively. This new UE-specific parameter may be indicated using L1 signaling, such as a new Downlink Control Information, DCI, message or a new field incorporated into an existing DCI message. The new DCI can be sent on the DL of either the PCell or the SCell of the UE.

The allowed maximum bandwidths for the enhanced SRS can be the same as the legacy SRS to maintain existing transmission complexity of the UE as well as the reception processing at the eNB. The minimum bandwidths allowed for a UE in a given SRS configuration set may be reduced so as to allow more UEs to transmit the enhanced SRS without overlapping in frequency.

The frequency comb pattern of the enhanced SRS can be extended to every four Resource Elements, REs, from every other RE at present. In other words, the enhanced SRS of a particular UE is mapped to every fourth RE in a given symbol, up to the assigned SRS bandwidth for that UE. This corresponds to a new repetition factor of four and allows multiplexing a larger number of UEs. The existing UE-specific parameter "transmissionComb" may, according to the teachings herein, be extended to have two more bits applicable to the enhanced SRS. The requirement of minimum SRS sequence length of 12 implies that the minimum SRS bandwidth is four RBs for the new comb of every four REs.

Another notable aspect of the enhanced SRS is its sequence design. Two extensions are proposed to increase the number of available orthogonal SRS sequences when multiple UEs transmit on the same REs using the same comb pattern. The first extension is to extend the number of available UE-specific cyclic shifts from eight to twelve. The cyclic shift of the enhanced SRS is given as $$a_{\tilde{p}} = 2\pi \frac{n_{SRS}^{cs,\tilde{p}}}{12} \text{ where } n_{SRS}^{cs,\tilde{p}} = \left(n_{SRS}^{cs} + \frac{12\tilde{p}}{N_{ap}}\right) \text{mod} 12,$$

and $$\tilde{p} \in \{0,1,\ldots,N_{ap}-1\}, \text{ and}$$

where $n_{SRS}^{cs} = \{0,1,2,3,4,5,6,7,8,9,10,11\}$ can be configured by a new higher-layer parameter cyclicShift-enh for each UE, and where $N_{ap}$ denotes the number of antenna ports used for SRS transmission.

A second extension contemplated for enhanced SRS herein is to allow the option of applying orthogonal cover codes or OCCs for the enhanced SRS when transmitted on multiple symbols within a subframe. With this approach, an eNB uses a new DCI message field to signal to a UE the OCC to be used for enhanced SRS transmission by the UE. The new DCI can be sent on the DL of either the PCell or the SCell of the UE.

Thus, with the proposed modifications, up to forty-eight orthogonal, full-bandwidth SRS configurations are available for a single enhanced SRS symbol. The transmission of enhanced SRS after a successful LBT phase takes precedence over any other transmission, such as PRACH. It is further noted here that these teachings can be extended by introducing a larger number of cyclic shifts or frequency comb patterns.

Assuming a synchronous operation, it is contemplated herein that multiple UEs can simultaneously transmit enhanced SRSs in time within the same subframe after they have deemed the channel to be idle. One significant advantage of using enhanced SRS for UL RS transmission after LBT is that by appropriate configuration of orthogonal SRSs by the network, the eNB can identify which UEs have been successful in channel contention and are expected, therefore, to transmit using their UL grants. Thus, there is no need for a new, separate message from UEs to the eNB to indicate whether they have succeeded or failed in channel contention.

Figure 9:
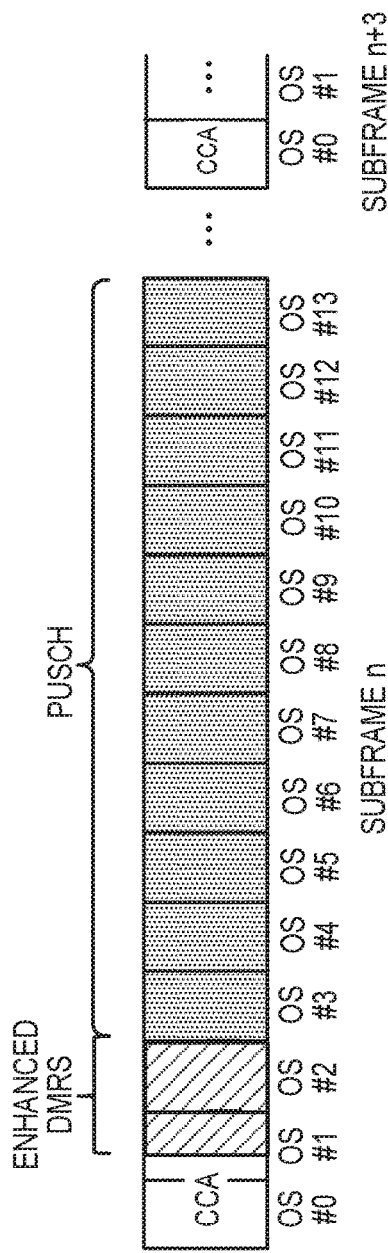
FIG. 9 is a diagram of one embodiment of enhanced DMRS transmission as contemplated herein.

In another embodiment, the UL DMRS is enhanced for use as an enhanced RS in a punctured subframe. The enhanced DMRS can be transmitted in a variable position within the RBs of the UL grant of the UE, and can be transmitted on multiple consecutive symbols. An example of enhanced DMRS transmission is shown in FIG. 9.

Figure 10:
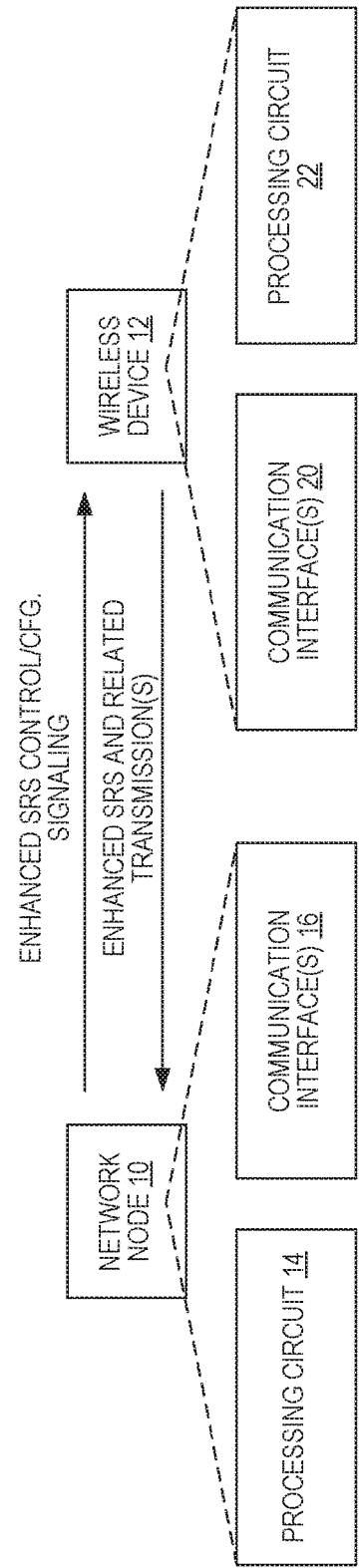
FIG. 10 is a block diagram of one embodiment of a network node and a wireless device, as configured for network-side and device-side aspects of the enhanced RS teachings presented herein.

FIG. 10 illustrates an example network node 10 and a wireless device 12 that are configured according to the teachings herein. The network node 10 comprises, for example, a base station in a RAN, and the wireless device 12 will be understood as being configured for operation according to the particulars of the air interface provided by the RAN.

The network node 10 includes a processing circuit 14 and one or more communication interfaces 16. In at least one embodiment, the network node 10 comprises a LTE eNB, such as an LTE eNB configured to support LAA using a PCell in licensed spectrum and a SCell in unlicensed spectrum. More generally, the network node 10 is configured for operation in a wireless communication network, and is particularly configured to control or otherwise configure the use of enhanced RSs by any number of wireless devices.

Here, one such wireless device 12 is shown for ease of discussion. The depicted wireless device 12 includes one or more communication interfaces 20 and a processing circuit 22 that is operatively associated with the one or more communication interfaces 20. As used herein, the term "wireless device 12" shall be understood as comprising essentially any type of wireless device or apparatus that is configured operation in a wireless communication network according to the teachings herein. The terms "User Equipment" or "UE" may be used interchangeably with the term "wireless device" and non-limiting examples of the wireless device 12 include a cellular radiotelephone, such as a smartphone or a feature phone, a computer tablet with wireless communications, a laptop, a network adaptor or other modem device, etc.

In one example where the network node 10 comprises a base station, such as an eNB. Correspondingly, in such embodiments, the communication interface(s) 16 of the network node 10 include radio frequency, RF, transceiver circuits—i.e., one or more RF receivers and one or more RF transmitters, such as cellular radio transceivers. The communication interface(s) 16 may further include a core network communication interface for communicating with mobility management entities, packet routers, etc., such as the "S1" interfaces specified in LTE. Further in this example case, the communication interface(s) 16 may include one or more inter-node interfaces, such as an inter-base station or "sidehaul" interface, such as the "X2" interface specified in LTE.

The one or more communication interfaces 16 may be configured for communicating directly or indirectly with any given wireless device 12. In one example of indirect communication, the node 10 sends signaling that is forwarded to the wireless device 12 by another node in the network, or sends signaling that prompts another node to send related signaling towards the wireless device 12. In an example of direct communication, the node 10 and the wireless device 12 operate as protocol endpoints with respect to one another. Even here, however, the involved signaling may pass through one or more intervening nodes and/or may go through several layers of network-related protocol processing.

The processing circuit 14 of the network node 10 may comprise more than one processing circuit. For example, the processing circuit 14 includes one or more microprocessors, microcontrollers, Digital Signal Processors or DSPs, Application Specific Integrated Circuits or ASICs, Field Programmable Gate Arrays or FPGAs, or Complex Programmable Logic Devices or CPLDs. In general, the processing circuit 14 comprises appropriately configured digital processing circuitry and includes or is associated with supporting circuits, such as clock circuitry, power control circuitry, input/output circuitry, and interface circuitry interfacing the processing circuit 14 to the communication interface(s) 16, e.g., for data and control signaling transmission, data and control signaling reception, configuration control, signal strength measurements, etc.

The processing circuit 14 may, in general, comprise one or more fixed circuits, one or more programmed circuits, or any mix thereof. In at least one embodiment, the processing circuit 14 is specially adapted to carry out any of the network-side processing operations taught herein, based on its execution of computer program instructions stored in a computer readable medium in or accessible to the processing circuit 14. In an example base station configuration, the processing circuit 14 is implemented from one or more "backplane" circuits and any involved or allocated ones among a number of installed processing cards that provide various aspects of the overall communication and control processing provided by the node 10 in a base station context.

Although it may be significantly less complicated than the network node 10, the example wireless device 12 likewise includes one or more communication interfaces 20 and a processing circuit 22 that is operatively associated with the communication interface(s) 20. In general the communication interface(s) 20 include radio frequency, RF, transceiver circuits—i.e., one or more RF receivers and one or more RF transmitters, such as cellular radio transceivers. In particular, the communication interface(s) 20 in an example embodiment include receiver circuitry enabling the wireless device 12 to communicate according to all relevant LTE specifications—i.e., to communicate according to the LTE air interface—including all aspects of such communication that are related to the configuration and use of enhanced RS as taught herein.

The communication interface(s) 20 and the supporting control and configuration of the processing circuit 22 also may permit the wireless device 12 to operate on more than one Radio Access Technology or RAT. For example, the wireless device 12 may support multiple cellular RATs, such as WCDMA and LTE, and may additionally support non-cellular RATs, such as Near Field Communications, Device-to-Device communications, IEEE 802.11 Wi-Fi, Bluetooth, etc.

The processing circuit 22 may comprise more than one processing circuit, such as one or more microprocessors, microcontrollers, Digital Signal Processors or DSPs, Application Specific Integrated Circuits or ASICs, Field Programmable Gate Arrays or FPGAs, Complex Programmable Logic Devices or CPLDs, or other digital processing circuitry along with supporting circuits, such as clock circuitry, power control circuitry, input/output circuitry, and circuitry interfacing with and providing measurement, monitoring and control functions for the communication interfaces 20.

Broadly, the processing circuit 22 may comprise one or more fixed circuits, one or more programmed circuits, or any mix thereof. In at least one embodiment, the processing circuit 22 is specially adapted to carry out any of the device-side processing operations taught herein, based on its execution of computer program instructions stored in a computer readable medium in or accessible to the processing circuit 22.

Figure 11:
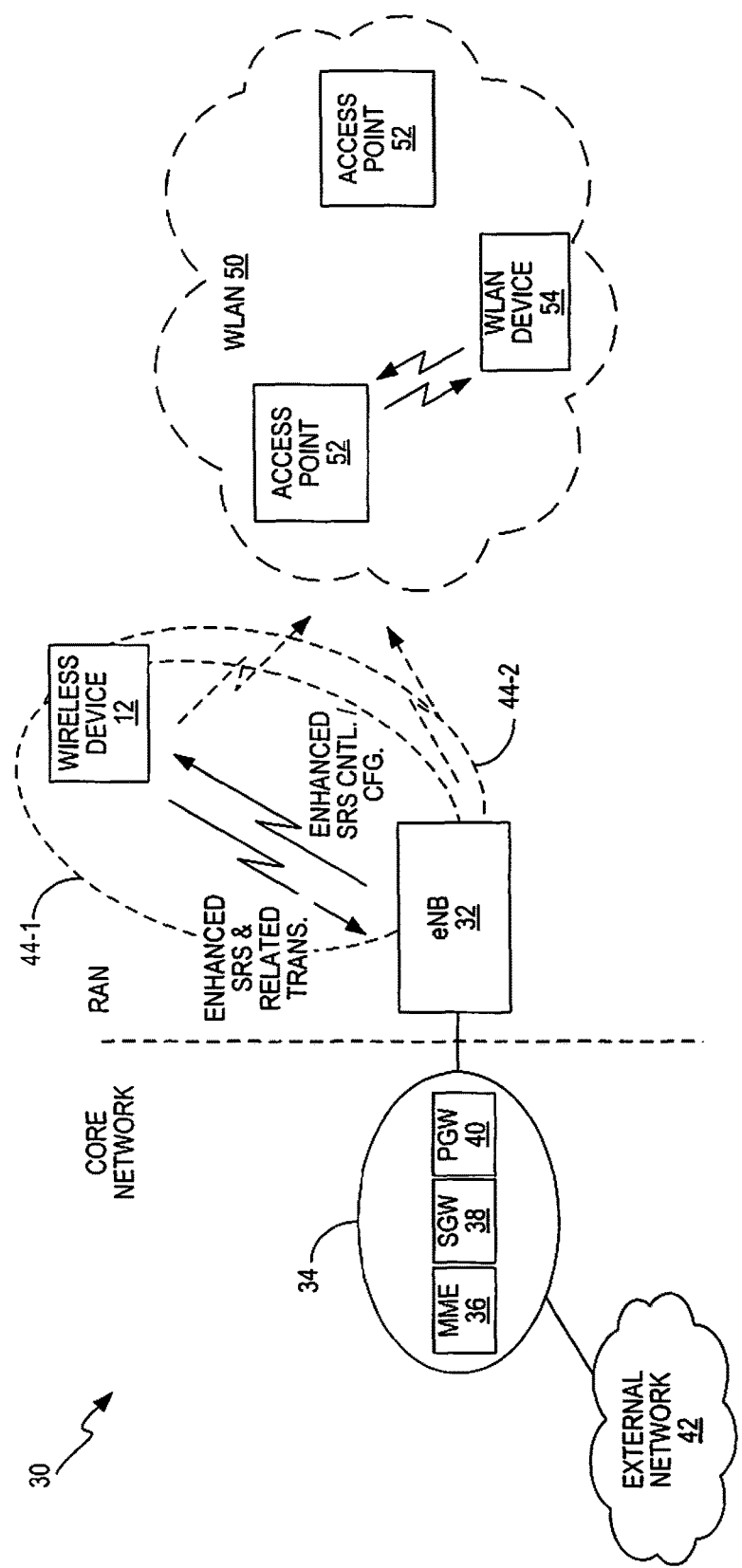
FIG. 11 is a block diagram of one embodiment of a wireless communication network, configured for network-side and device-side aspects of the enhanced RS teachings presented herein.

FIG. 11 illustrates one embodiment of wireless communication network 30, which is shown according to an example LTE configuration. The wireless communication network 30, hereafter "network 30", includes any number of base stations 32, where one such base station 32 is shown for ease of illustration and is labeled as "eNB 32" in keeping with the LTE context. The eNBs 32 are included in the Radio Access Network or RAN portion of the network 30, which further includes a Core Network or CN portion 34. The CN 34 provides for, among other things, authentication, authorization, and accounting functions for wireless devices 12 connecting to and using the network 30, and for communicating with devices, systems and services accessible via one or more external networks 42, which are communicatively coupled to the CN 34.

In this example illustration, the CN 34 includes a mobility management entity or MME 36, a Serving Gateway or SGW 38, and a Packet Data Network Gateway or PGW 40. The MME 36 provides a number of mobility management functions, such as bearer activation/deactivation process selecting and reselecting which SGW 38 to use for supporting the wireless device 12. The SGW 38 provides routing and forwarding for user data packets. For a wireless device 12 operating in an idle state, its SGW 38 provides downlink data path termination and initiates wireless device paging response to the receipt of downlink data targeting the wireless device 12. Finally, the PGW 40 communicatively couples given wireless devices 12 to external packet data networks, such as the illustrated external network 42. Of course, there may be multiple instances of the illustrated node types and the CN 34 generally will have additional nodes of other types, such as authentication servers, etc.

In an example embodiment, the eNB 32 acts as or otherwise functionally includes the aforementioned network node 10. The eNB 32 as such is configured to control or configure the use of enhanced RS by any number of wireless devices 12, e.g., at least for those wireless devices 12 for which the eNB 32 operates as a "serving" base station. Thus, one sees in the diagram control and/or configuration signaling going from the eNB 32 to the depicted wireless device 12, which performs enhanced RS and related transmissions under the control of the eNB 32, or otherwise in accordance with the configuration and control information provided to it. As noted, the enhanced RS transmissions by the wireless device 12 may comprise enhanced SRS and/or enhanced DMRS transmissions in accordance with control and/or configuration information provided by the network 30.

The depiction of the network 30 also includes an example depiction of two "cells" 44-1 and 44-2. The depicted eNB 32 may provide both cells 44-1 and 44-2, e.g., using different carriers, or there may be another base station providing the second cell 44-2. Here, the term "cell" broadly refers to the allocation or use of specific spectrum or other such radio resources to a given geographic area. In this regards, any number of given cells 44 may partially or even wholly overlap, such as where multiple carriers cover roughly the same geographic area(s). Of course, there may be multiple, geographically distributed base stations 32 each providing one or more cells 44 that overlap in such a way as to provide relatively complete coverage over a wider geographic area. Note that in this explanation, the reference number "44" without any suffix is used to refer generically to any one such cell, or to any two or more such cells.

In some scenarios, such as with CA or Coordinated MultiPoint, CoMP, Transmission, Dual-Connectivity, DC, operation, the wireless device 12 may be served from multiple cells 44. In such configurations, the wireless device 12 will have one cell 44 as a PCell and one or more cells 44 as SCells.

In another notable aspect of the above network diagram, one sees that the cell(s) 44 associated with the eNB 32 of the network 30 overlap with or are in close proximity to a Wireless Local Access Network, WLAN, 50. The WLAN 50 includes one or more WLAN access points 52 and one or more WLAN devices 54. In an example case, the WLAN 50 is an IEEE 802.11 WI-FI network operating in the 5 GHz unlicensed spectrum. Correspondingly, the network 30 is configured to operate in both licensed spectrum and, at least selectively or conditionally in some service scenarios, also operate in the same unlicensed spectrum as the WLAN 50.

Advantageously, the network 30, e.g., via the eNB 32, is configured to control or otherwise configure the use of enhanced SRS and/or DMRS by the wireless device 12. In turn, the wireless device 12 uses the enhanced SRS and/or DMRS, for example, to reduce interference with respect to the WLAN 50 or otherwise to improve its operation in LBT operating scenarios.

Figure 12:
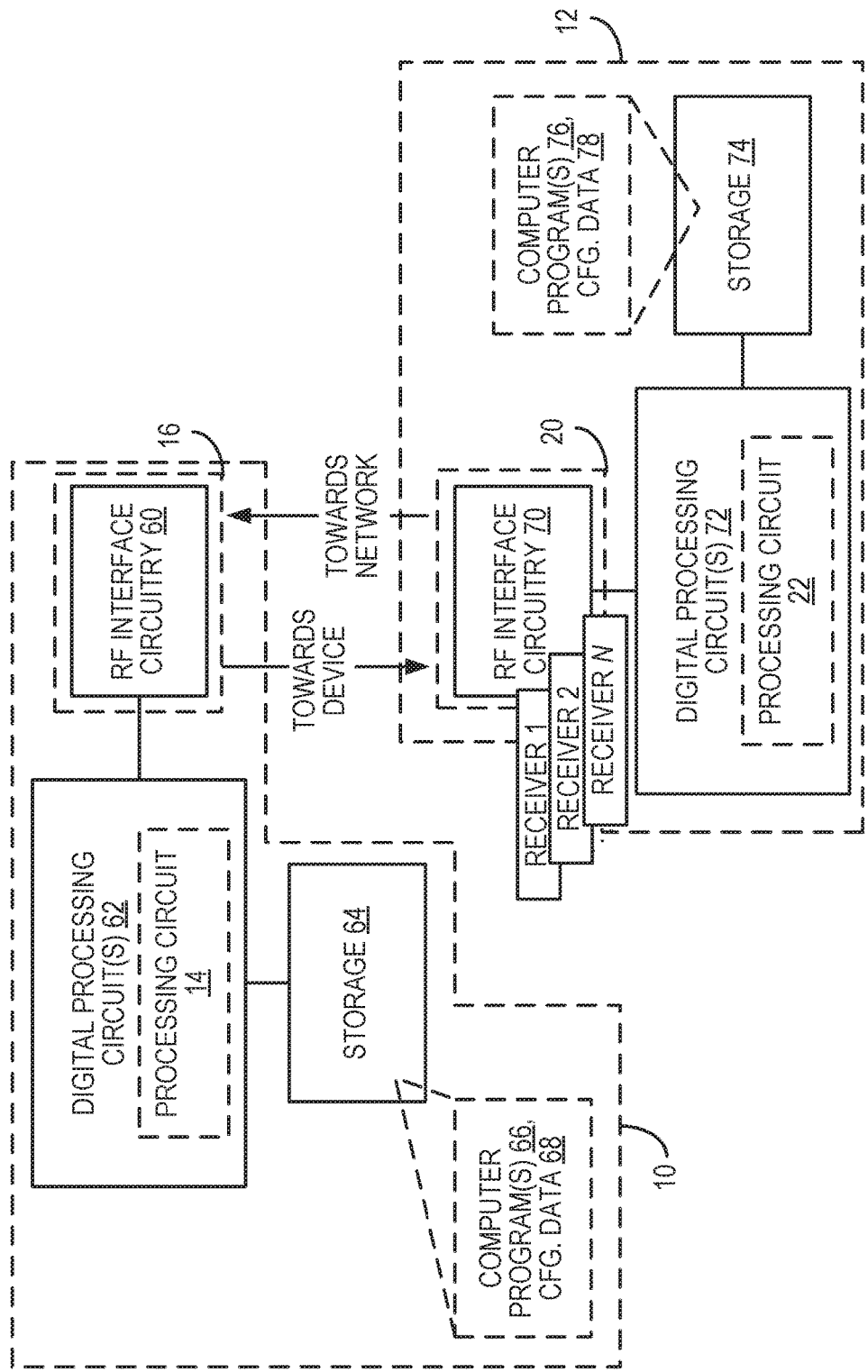
FIG. 12 is a block diagram of example details for the network node and wireless device introduced in FIG. 10.

FIG. 12 provides non-limiting implementation details for a network node 10 and a wireless device 12 that are respectively configured according to the network-side and device-side teachings presented herein. Again, the network node 10 may comprise an eNB 32 or other such radio network node, and its one or more communication interfaces 16 may therefore include radiofrequency interface circuitry 60, i.e., RF transmitters and RF receivers for communicating with a potentially large number of wireless devices 12, e.g., according to the LTE air interface specifications and/or other Radio Access Technologies, RATs.

The processing circuit 14 may be realized within a larger set or arrangement of digital processing circuits 62, which include or which are associated with storage 64. In an example embodiment, the storage 64 provides non-transitory storage for a computer program 66 and configuration data 68. Here, "non-transitory" means that the storage 64 provides for permanent, semi-permanent, or at least temporarily persistent storage for the computer program 66 and, as such, it encompasses non-volatile and/or volatile, working-memory storage of the computer program instructions comprising the computer program 66. The same is true for the configuration data 68, which may be preconfigured data, dynamically determined data, or some mix thereof. The storage 64 comprises at least one type of computer-readable medium and may comprise a mix of types. Non-limiting example types of storage circuits or devices include a hard disk, a solid-state disk or SSD, FLASH memory, EEPROM or ROM memory, and DRAM and/or SRAM with or without battery backup.

The network node 10 is configured to perform network-side operations as taught herein according to the configuration of fixed and/or programmed circuitry within the network node 10. For example, the network node 10 is so configured at least in part based on the execution by the digital processing circuits 62 of computer program instructions included in the computer program 66.

Broadly, the network node 10 is configured for operation in a wireless communication network 30 and includes a communication interface 16 configured for sending signaling to one or more wireless devices 12 operating in the wireless communication network 30 and receiving signaling from such wireless communication devices 12. The network node 10 further includes a processing circuit 14 that is operatively associated with the communication interface 16 and configured to determine device-specific configuration settings for one or more of the wireless devices 12, which device-specific configuration settings control, for a corresponding one of the wireless devices 12, at least one of the following: whether the wireless device 12 uses an enhanced Reference Signal, RS, for capturing communication channels as part of LBT operations performed by the wireless device 12; and one or more configuration settings controlling corresponding transmission parameters of any enhanced RS transmissions by the wireless device 12.

The processing circuit 14 is further configured to send the corresponding device-specific configuration settings to individual ones of the one or more wireless devices 12. In at least one embodiment, the processing circuit 14 is configured to orthogonalize the enhanced RS transmissions among multiple wireless devices 12 via the device-specific configuration settings. For example, in at least one such embodiment, the processing circuit 14 is configured to set different OCCs for individual wireless devices 12 to apply to their respective enhanced RS transmissions, and to indicate the different OCCs in the respective device-specific configuration settings sent to the individual wireless devices 12. Further, the processing circuit 14 in such embodiments is configured to use the OCCs to differentiate between the enhanced RS transmissions received from different ones of the individual wireless devices 12.

In some embodiments, the processing circuit 14 is configured to include a frequency comb pattern setting in the device-specific configuration settings. The frequency comb pattern settings control how a corresponding wireless device 12 maps the enhanced RS to REs associated with the communication channel to be used.

In the same embodiment(s), or in one or more other embodiments, the processing circuit 14 is configured to set or limit a bandwidth of the enhanced RS transmission as part of the device-specific configuration settings, e.g., to prevent or control frequency overlap between the enhanced RS transmissions as sent from different wireless devices 12. Additionally, or alternatively, the processing circuit 14 is configured to configure device-specific cyclic shifts to be used for enhanced RS transmission, as part of the device-specific configuration settings.

Still further, in at least some embodiments, the processing circuit 14 is configured to enable or disable use of the enhanced RS for communication channel capturing by a given wireless device 12, to support operation of the given wireless device 12 in a LAA mode of operation. With the LAA mode of operation, a PCell carrier used for the wireless device 12 is in a licensed spectrum and a SCell carrier used for the wireless device 12 is in an unlicensed spectrum. Enabling use of the enhanced RS allows here allows the wireless device 12 to quickly capture a communication channel in the unlicensed spectrum in response to determining that the involved communication channel is clear.

Regardless of its implementation details, the network node 10 in one or more embodiments is configured to perform a method 100 such as shown in FIG. 13. The method 100 includes determining (Block 102) device-specific configuration settings for one or more of wireless devices 12. The device-specific configuration settings control, for a corresponding one of the wireless devices 12, at least one of the following: whether the wireless device 12 uses an enhanced RS for capturing communication channels as part of LBT operations performed by the wireless device 12; and one or more configuration settings controlling corresponding transmission parameters of any enhanced RS transmissions by the wireless device 12. The method 100 further includes sending (Block 104) the corresponding device-specific configuration settings to individual ones of the one or more wireless devices 12.

Turning back to FIG. 12 momentarily, the wireless device 12 may be essentially any type of device or apparatus configured for wireless communications within a wireless communication network 30 and its one or more communication interfaces 20 may therefore include radiofrequency interface circuitry 70, i.e., one or more RF transmitters and RF receivers for communicating with a wireless communication network 30, e.g., according to the LTE air interface specifications and/or other RATs. Note that the RF interface circuitry 70 may at least functionally include more than one "receiver" or at least receiver front-end, for simultaneous operation on multiple carriers, e.g., at different frequencies and potentially in different frequency bands. Of course, the wireless device 12 also may have one or more wideband receivers that are configured for the reception of two or more carriers in contiguous or nearby frequencies.

The processing circuit 22 may be realized within a larger set or arrangement of digital processing circuits 72, which include or which are associated with storage 74. In an example embodiment, the storage 74 provides non-transitory storage for a computer program 76 and for configuration data 78. Here, "non-transitory" means that the storage 74 provides for permanent, semi-permanent, or at least temporarily persistent storage for the computer program 76 and, as such, it encompasses non-volatile and/or volatile, working-memory storage of the computer program instructions comprising the computer program 76. The same is true for the configuration data 78, which may be preconfigured data, dynamically determined data, or some mix thereof. The storage 74 comprises at least one type of computer-readable medium and may comprise a mix of types. Non-limiting example types of storage circuits or devices include a hard disk, a solid-state disk or SSD, FLASH memory, EEPROM or ROM memory, and DRAM and/or SRAM with or without battery backup.

The wireless device 12 is configured to perform device-side operations as taught herein according to the configuration of fixed and/or programmed circuitry within the wireless device 12. For example, the wireless device 12 is so configured at least in part based on the execution by the digital processing circuitry 72 of computer program instructions included in the computer program 76.

A wireless device 12 in an example embodiment is configured for operation in a wireless communication network 30 and includes one or more communication interfaces 20 configured for transmitting signals to the network 30 and receiving signals from the network 30. The wireless device 12 in this example configuration further includes a processing circuit 22 that is operatively associated with the communication interface(s) 20 and is configured to: perform a LBT operation to assess whether a communication channel is clear to use for an uplink data transmission by the wireless device 12 and begin transmitting an enhanced RS responsive to determining that the communication channel is clear, to thereby capture the communication channel. The processing circuit 22 is further configured to transition from transmission of the enhanced RS to transmission of uplink data at a defined time after capturing the communication channel. Unless otherwise indicated, the term "uplink data" as used herein denotes the transmission of user traffic, or the transmission of control signaling, or any combination of user traffic and control signaling.

Uplink transmissions by the wireless device 12 are, in at least some embodiments, performed in accordance with a defined uplink signal structure comprising recurring uplink frames, with each uplink frame comprising a set of subframes. For a case where the LBT operation is performed prior to a given subframe boundary, the processing circuit 22 is configured to make the transition from transmission of the enhanced RS to transmission of the uplink data at the given subframe boundary. That is, the wireless device 12 uses the enhanced RS to capture the channel in advance of a subframe boundary, and transitions from enhanced RS transmission to uplink data transmission at the subframe boundary.

In the same or another embodiment, the uplink transmissions by the wireless device 12 are performed in accordance with a defined uplink signal structure comprising recurring uplink frames with each uplink frame comprising a set of subframes. For a case where the LBT operation is performed by puncturing a beginning number of symbol periods in a given subframe, the processing circuit 22 is configured to make the transition from transmission of the enhanced RS to transmission of the uplink data after the beginning number of symbol periods.

In a particular example, uplink transmissions by the wireless device 12 are performed in accordance with a defined uplink signal structure comprising recurring uplink frames, with each uplink frame comprising a set of subframes. The processing circuit 22 performs the LBT operation by puncturing a beginning number of symbol periods at the start of a given subframe, and transmits an enhanced SRS or an enhanced DMRS as the aforementioned enhanced RS, within the beginning number of symbol periods to capture the communication channel.

In one or more embodiments, the processing circuit 22 is configured to perform the LBT operation by monitoring for received signal energy at a frequency corresponding to the communication channel. The processing circuit 22 deems the communication channel as being clear responsive to determining that the received signal energy, if any, is below a defined threshold. The clear condition of the channel may be referred to as an idle or not-busy condition, whereas the not-clear condition may be referred to as a busy condition.

Advantageously, the processing circuit 22 in one or more embodiments is configured to capture the communication channel by beginning transmission of the enhanced RS within the same subframe in which the communication channel is deemed to be clear. For example, the processing circuit 22 begins enhanced RS transmission within a same symbol period in which the communication channel is deemed clear or in a succeeding symbol period.

In at least some embodiments, the processing circuit 22 is configured to enable and disable its use of the enhanced RS responsive to control signaling received from the network 30. Further, in at least some embodiments, the processing circuit 22 is configured to transmit the enhanced RS according to configuration information that is at least in part signaled from the network 30. Such configuration information defines or controls any one or more of the following items: a frequency comb pattern or repetition factor to be used for mapping the enhanced RS to corresponding REs defined in association with the communication channel; a bandwidth parameter to define or limit the bandwidth of the enhanced RS; a cyclic shift parameter to define the cyclic shift used by the wireless device 12 for transmission of the enhanced RS; an orthogonal cover code, OCC, to be applied by the wireless device 12 to the enhanced RS, at least for cases when the enhanced RS is transmitted in multiple symbol periods within a given subframe; an enablement parameter the value of which enables or disables use of the enhanced RS by the wireless device 12; and a mode parameter.

The value of the contemplated mode parameter indicates to the wireless device 12 whether or not the enhanced RS should be used only for capturing the channel, or should be used for channel capture and for sending reference signals during the uplink data transmission that follows channel capture. In a particular embodiment, the mode parameter indicates that the enhanced RS is to be used only for UL RS transmission after the LBT operation, while the legacy SRS is to be used in a last symbol of each configured subframe, for the remainder of the UL transmission, or indicates that the enhanced RS parameters are to be used for both UL RS transmission after the LBT operation and also in the remainder of the UL transmission. Put simply, the mode parameter may indicate to the wireless device 12 whether or not is should use the enhanced RS only for channel capture in association with LBT operations, or should use enhanced RS transmissions both for channel capture and for making RS transmissions at designated times with respect to the uplink data transmission.

In at least some embodiments, the wireless device 12 is configured for operation in a LTE network. In such embodiments, the enhanced RS is at least one of an enhanced SRS and an enhanced DMRS.

However implemented, the wireless device 12 in one or more embodiments is configured to perform a method 110 as illustrated in FIG. 14. The method 110 includes performing (Block 112) a LBT operation to assess whether a communication channel is clear to use for an uplink data transmission by the wireless device 12, beginning (Block 114) transmission of an enhanced RS responsive to determining that the communication channel is clear, to thereby capture the communication channel, and transitioning (Block 116) from transmission of the enhanced RS to transmission of uplink data at a defined time after capturing the communication channel.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A wireless device configured for operation in a wireless communication network and comprising:
   a communication interface configured for transmitting signals to the wireless communication network and receiving signals from the wireless communication network; and
   a processing circuit operatively associated with the communication interface and configured to:
      perform a listen-before-talk (LBT) operation to assess whether a communication channel is clear to use for an uplink transmission by the wireless device;
      begin transmitting an enhanced Reference Signal (RS), responsive to determining that the communication channel is clear, to thereby capture the communication channel; and
      transition from transmission of the enhanced RS to transmission of uplink data at a defined time after capturing the communication channel, wherein uplink transmissions by the wireless device are performed in accordance with a defined uplink signal structure comprising recurring uplink frames with each uplink frame comprising a set of subframes, and wherein for a case where the LBT operation is performed prior to a given subframe boundary, the processing circuit is configured to make the transition from transmission of the enhanced RS to transmission of the uplink data at the given subframe boundary,
   wherein the processing circuit is configured to transmit the enhanced RS according to configuration information that is at least in part signaled from the wireless communication network, and
   wherein the configuration information defines or controls any one or more of the following items:
      a frequency comb pattern or repetition factor to be used for mapping the enhanced RS to corresponding Resource Elements (REs) defined in association with the communication channel;
      a bandwidth parameter to define or limit the bandwidth of the enhanced RS;
      a cyclic shift parameter to define the cyclic shift used by the wireless device for transmission of the enhanced RS;
      an orthogonal cover code (OCC) to be applied by the wireless device to the enhanced RS, at least for cases when the enhanced RS is transmitted in multiple symbol periods within a given subframe;
      an enablement parameter, the value of which enables or disables use of the enhanced RS by the wireless device; and
      a mode parameter, the value of which indicates that the enhanced RS is to be used only for uplink RS transmission after the LBT operation, while a legacy Sounding Reference Signal (SRS) is to be used in a last symbol of each configured subframe, for the remainder of the uplink transmission, or that the enhanced RS is to be used for both uplink RS transmission after the LBT operation and also in the remainder of the uplink transmission.

2. The wireless device of claim 1, wherein uplink transmissions by the wireless device are performed in accordance with a defined uplink signal structure comprising recurring uplink frames with each uplink frame comprising a set of subframes, and wherein for a case where the LBT operation is performed by puncturing a beginning number of symbol periods in a given subframe, the processing circuit is configured to make the transition from transmission of the enhanced RS to transmission of the uplink data after the beginning number of symbol periods.

3. The wireless device of claim 1, wherein uplink transmissions by the wireless device are performed in accordance with a defined uplink signal structure comprising recurring uplink frames with each uplink frame comprising a set of subframes, wherein the processing circuit performs the LBT operation by puncturing a beginning number of symbol periods at the start of a given subframe and transmits the enhanced RS within the beginning number of symbol periods to capture the communication channel, and wherein the enhanced RS is an enhanced Sounding Reference Signal (SRS) or an enhanced Demodulation Reference Signal (DMRS).

4. The wireless device of claim 1, wherein the processing circuit is configured to perform the LBT operation by monitoring for received signal energy at a frequency corresponding to the communication channel and deem the communication channel as being clear responsive to determining that the received signal energy is below a defined threshold.

5. The wireless device of claim 1, wherein the processing circuit is configured to capture the communication channel by beginning transmission of the enhanced RS within the same subframe in which the communication channel is deemed to be clear, by beginning enhanced RS transmission within a same symbol period in which the communication channel is deemed clear or in a succeeding symbol period.

6. The wireless device of claim 1, wherein the processing circuit is configured to enable and disable its use of the enhanced RS, responsive to control signaling received from the wireless communication network.

7. The wireless device of claim 1, wherein the wireless device is configured for operation in a Long Term Evolution (LTE) network, and wherein the enhanced RS is at least one of an enhanced Sounding Reference Signal (SRS) and an enhanced Demodulation Reference Signal (DMRS).

8. A method of operation by a wireless device configured for operation in a wireless communication network, said method comprising:
performing a listen-before-talk (LBT) operation to assess whether a communication channel is clear to use for an uplink data transmission by the wireless device;
beginning transmission of an enhanced Reference Signal (RS), responsive to determining that the communication channel is clear, to thereby capture the communication channel; and
transitioning from transmission of the enhanced RS to transmission of uplink data at a defined time after capturing the communication channel wherein the method includes transmitting the enhanced RS according to configuration information that is at least in part signaled from the wireless communication network, wherein uplink transmissions by the wireless device are performed in accordance with a defined uplink signal structure comprising recurring uplink frames with each uplink frame comprising a set of subframes, and wherein for a case where the LBT operation is performed prior to a given subframe boundary, the method includes transitioning from transmission of the enhanced RS to transmission of the uplink data at the given subframe boundary, and wherein the configuration information defines or controls any one or more of the following items:
a frequency comb pattern or repetition factor to be used for mapping the enhanced RS to corresponding Resource Elements (REs) defined in association with the communication channel;
a bandwidth parameter to define or limit the bandwidth of the enhanced RS; a cyclic shift parameter to define the cyclic shift used by the wireless device for transmission of the enhanced RS;
an orthogonal cover code (OCC) to be applied by the wireless device to the enhanced RS, at least for cases when the enhanced RS is transmitted in multiple symbol periods within a given subframe;
an enablement parameter, the value of which enables or disables use of the enhanced RS by the wireless device; and
a mode parameter, the value of which indicates that the enhanced RS is to be used only for uplink RS transmission after the LBT operation, while a legacy Sounding Reference Signal (SRS) is to be used in a last symbol of each configured subframe, for the remainder of the uplink transmission, or that the enhanced RS is to be used for both uplink RS transmission after the LBT operation and also in the remainder of the uplink transmission.

9. The method of claim 8, wherein uplink transmissions by the wireless device are performed in accordance with a defined uplink signal structure comprising recurring uplink frames with each uplink frame comprising a set of subframes, and wherein for a case where the LBT operation is performed by puncturing a beginning number of symbol periods in a given subframe, the method includes transitioning from transmission of the enhanced RS to transmission of the uplink data after the beginning number of symbol periods.

10. The method of claim 8, wherein uplink transmissions by the wireless device are performed in accordance with a defined uplink signal structure comprising recurring uplink frames with each uplink frame comprising a set of subframes, wherein the method includes performing the LBT operation by puncturing a beginning number of symbol periods at the start of a given subframe and transmitting the enhanced RS within the beginning number of symbol periods to capture the communication channel, and wherein the enhanced RS is an enhanced Sounding Reference Signal (SRS) or an enhanced Demodulation Reference Signal (DMRS).

11. The method of claim 8, wherein the method includes performing the LBT operation by monitoring for received signal energy at a frequency corresponding to the communication channel and deeming the communication channel as being clear responsive to determining that the received signal energy is below a defined threshold.

12. The method of claim 8, wherein the method includes capturing the communication channel by beginning transmission of the enhanced RS within the same subframe in which the communication channel is deemed to be clear.

13. The method of claim 8, wherein the method includes enabling and disabling use of the enhanced RS by the wireless device responsive to control signaling received by the wireless device from the wireless communication network.

14. The method of claim 8, wherein the wireless device is configured for operation in a Long Term Evolution (LTE) network, and wherein the method includes transmitting the enhanced RS as at least one of an enhanced Sounding Reference Signal (SRS) and an enhanced Demodulation Reference Signal (DMRS).

15. A network node configured for operation in a wireless communication network and comprising:
   a communication interface configured for sending signaling to one or more wireless devices operating in the wireless communication network and receiving signaling from such wireless communication devices; and
   a processing circuit operatively associated with the communication interface and configured to:
      determine device-specific configuration settings for one or more of the wireless devices,
      wherein the device-specific configuration settings control, for a corresponding one of the wireless devices, at least one of the following:
         whether the wireless device uses an enhanced Reference Signal (RS) for capturing communication channels, wherein said capturing is a part of listen-before-talk (LBT) operations performed by the wireless device; and
         one or more configuration settings controlling corresponding transmission parameters of any enhanced RS transmissions by the wireless device; and
      sending the corresponding device-specific configuration settings individually to the one or more wireless devices, wherein the processing circuit is configured to set or limit a bandwidth of the enhanced RS transmission as part of the device-specific configuration settings so as to prevent or control frequency overlap between the enhanced RS transmissions as sent from different ones of the wireless devices.

16. The network node of claim 15, wherein the processing circuit is configured to orthogonalize the enhanced RS transmissions among multiple wireless devices via the device-specific configuration settings.

17. The network node of claim 15, wherein the processing circuit is configured to set different Orthogonal Cover Codes (OCCs) for individual wireless devices to apply to their respective enhanced RS transmissions and to indicate the different OCCs in the respective device-specific configuration settings sent to the individual wireless devices, and wherein the processing circuit is further configured to use the OCCs to differentiate between the enhanced RS transmissions received from different ones of the individual wireless devices.

18. The network node of claim 15, wherein the processing circuit is configured to include a frequency comb pattern setting in said device-specific configuration settings, wherein the frequency comb pattern setting controls how the corresponding wireless device maps the enhanced RS to Resource Elements (REs) associated with the communication channel.

19. The network node of claim 15, wherein the processing circuit is configured to configure a device-specific cyclic shift to be used for enhanced RS transmission, as part of the device-specific configuration settings.

20. The network node of claim 15, wherein the processing circuit is configured to enable use of the enhanced RS for communication channel capturing by a given wireless device, to support operation of the given wireless device in a License-Assisted Access (LAA) mode of operation, in which a Primary Cell (PCell) carrier used for the wireless device is in a licensed spectrum and a Secondary Cell (SCell) carrier used for the wireless device is in an unlicensed spectrum, enabling use of the enhanced RS allows the wireless device to quickly capture a communication channel in the unlicensed spectrum in response to determining that the communication channel is clear.

21. A method of operation by a network node that is configured for operation in a wireless communication network, said method comprising:
   determining device-specific configuration settings for one or more wireless devices, wherein the device-specific configuration settings control, for a corresponding one of the wireless devices, at least one of the following:
      whether the wireless device uses an enhanced Reference Signal (RS) for capturing communication channels, wherein said capturing is a part of listen-before-talk (LBT) operations performed by the wireless device; and
      one or more configuration settings controlling corresponding transmission parameters of any enhanced RS transmissions by the wireless device; and
      sending the corresponding device-specific configuration settings individually to the one or more wireless devices, wherein the method further comprises setting or limiting a bandwidth of the enhanced RS transmission as part of the device-specific configuration settings so as to prevent or control frequency overlap between the enhanced RS transmissions as sent from different ones of the wireless devices.

22. The method of claim 21, wherein the method further comprises orthogonalizing the enhanced RS transmissions among multiple wireless devices via the device-specific configuration settings.

23. The method of claim 21, wherein the method includes setting different Orthogonal Cover Codes (OCCs) for individual wireless devices to apply to their respective enhanced RS transmissions, and to indicate the different OCCs in the respective device-specific configuration settings sent to the individual wireless devices, and wherein the method further includes using the OCCs to differentiate between the enhanced RS transmissions received from different ones of the individual wireless devices.

24. The method of claim 21, wherein the method further comprises setting or limiting a bandwidth of the enhanced RS transmission as part of the device-specific configuration settings so as to prevent or control frequency overlap between the enhanced RS transmissions as sent from different ones of the wireless devices.

25. The method of claim 21, wherein the method includes configuring a device-specific cyclic shift to be used for enhanced RS transmission, as part of the device-specific configuration settings.

26. The method claim 21, wherein the method includes enabling use of the enhanced RS for communication channel capturing by a given wireless device, to support operation of the given wireless device in a License-Assisted Access (LAA) mode of operation, in which a Primary Cell (PCell) carrier used for the wireless device is in a licensed spectrum and a Secondary Cell (SCell) carrier used for the wireless device is in an unlicensed spectrum, enabling use of the enhanced RS allows the wireless device to quickly capture a communication channel in the unlicensed spectrum in response to determining that the communication channel is clear.

27. The method of claim 21, wherein the method includes configuring a mode parameter in the device-specific configuration settings, the value of which indicates that the enhanced RS is to be used by the corresponding wireless device only for uplink RS transmission for communication channel capture after the LBT operation, while a legacy Sounding Reference Signal (SRS) is to be used in a last symbol of each configured subframe, for the remainder of the uplink transmission, or that the enhanced RS parameters are to be used by the wireless device for both uplink RS transmission after the LBT operation and also in the remainder of the uplink transmission.

* * * * *